Feb. 16, 1943.  F. H. HOY  2,310,958
APPARATUS FOR MOLDING MEATS
Filed May 3, 1941
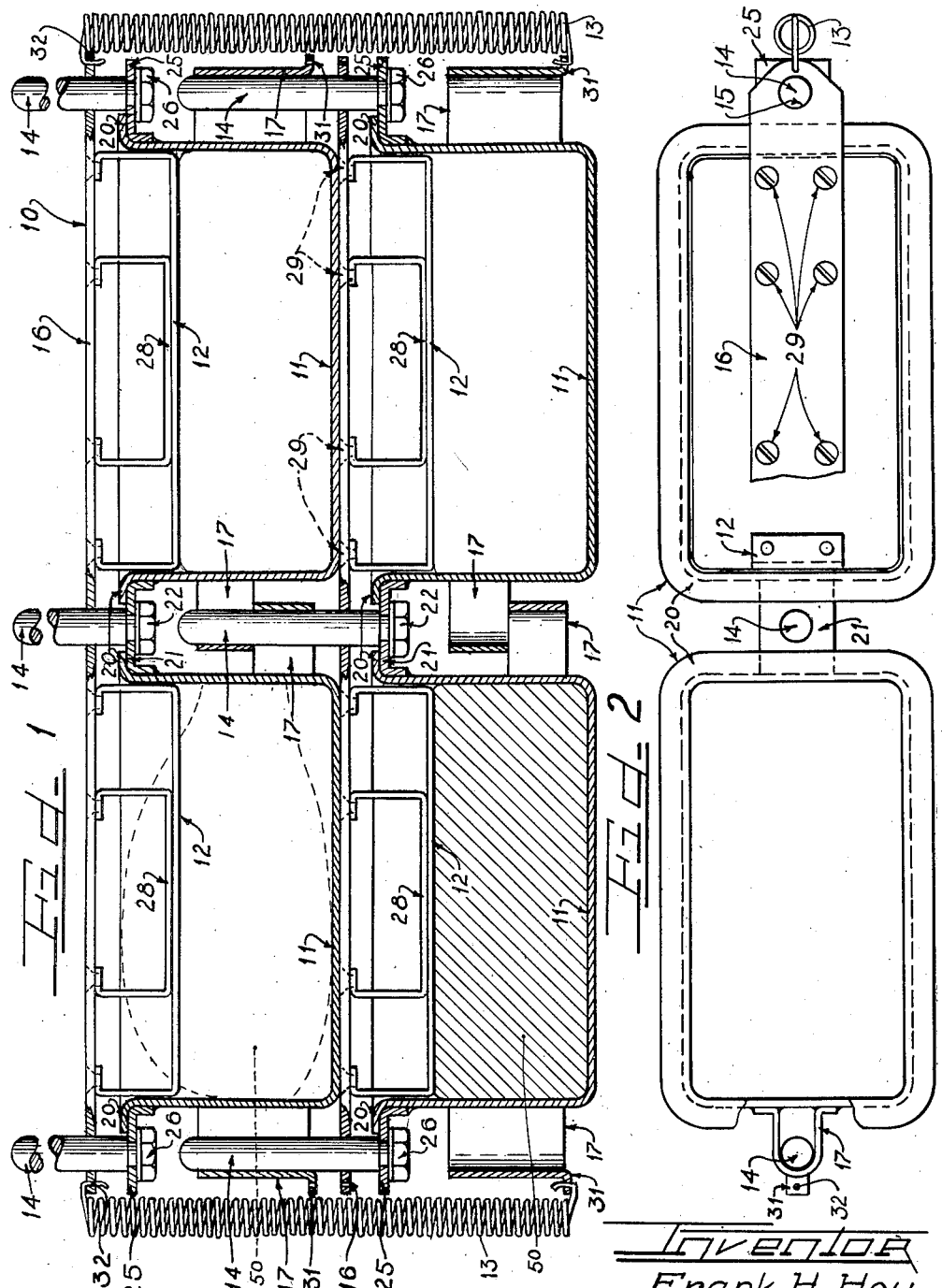
Inventor
Frank H. Hoy.

Patented Feb. 16, 1943

2,310,958

UNITED STATES PATENT OFFICE 2,310,958

APPARATUS FOR MOLDING MEATS

Frank H. Hoy, Milwaukee, Wis., assignor to Hoy Equipment Company, Milwaukee, Wis., a corporation of Wisconsin Application May 3, 1941, Serial No. 391,636

10 Claims. (Cl. 53—22)

This invention relates to an apparatus for cooking and pressing meat products such as hams and the like from which the bones have been removed.

The present application is a continuation-in-part of my application Serial No. 348,630 filed July 31, 1940, entitled "Method of and apparatus for the multiple molding of hams and the like."

The apparatus of the present invention is particularly adapted for use in processes for cooking and molding meat products including the steps of forcibly compressing meat in a plurality of molds and then, while maintaining the meat under less forceful pressure, cooking or otherwise processing the compressed meat which is finally cooled while still in the molds. This whole process is carried out continuously, the molds being combined in unitary groups for compressing and the groups of compressed molds being transported as units into and out of processing tanks and finally subjected to cooling.

It is an object of the present invention to provide an apparatus for multiple processing and molding of meat including a number of molds not limited by the capacity of independent guide means for aligning the same.

Another object of this invention is to provide an apparatus for multiple processing and molding of meat including a large number of molds yet capable of rapid assembly and disassembly.

Still another object of the invention is to provide a simplified, compact, strongly constructed apparatus of large capacity for multiple processing and molding of meat comprising a small number of relatively movable parts.

Yet another object of the invention is to provide, in an apparatus for multiple processing and molding of meat, a large number of stacked molds without necessarily including separate guide means for each mold.

A further object of the invention is to provide a meat processing and molding apparatus that is easily cleaned and kept in a sanitary condition.

The apparatus of the present invention may be generally described as including rows of rigidly interconnected molds and groups of rigidly interconnected follower members spaced and aligned to fit the molds. Upstanding guide members associated with each row of molds are slidable in the follower members or the means interconnecting the same and in ears of other similar rows of molds, so that rows of molding units and follower members stacked alternately one on top of the other are maintained in their aligned relationship. Pressure-generating means are provided for telescoping the follower members into the molds to compress meat contained therein, as well as for maintaining both the stacked relationship and the telescoped relationship.

Since the apparatus includes, as a movable unit, a stacked assembly of tiers of rigidly interconnected molding units, each tier having guide means for another tier to be stacked thereon, the movable stacked assembly can be composed by any desired number of tiers of molding units.

The groups of interconnected molds and guide means associated with said groups, as well as the groups of interconnected follower members are, of course, movable as units rather than as individual molds, guide means or follower members.

The guide means being associated with the groups of interconnected molds, separate guide means need not be provided for each mold.

Other and further objects and features of this invention will become apparent from the following description and appended drawing which illustrates a preferred form of apparatus according to this invention.

In the drawing:

Figure 1 is a fragmentary longitudinal vertical cross-sectional view, with parts shown in elevation, of a multiple processing and molding apparatus according to the invention.

Figure 2 is a top plan view, with parts broken away, of a group of interconnected molds and a group of interconnected follower members as assembled in the apparatus of Figure 1.

As shown on the drawing:

In Figure 1 the reference numeral 10 indicates generally a multiple processing and molding apparatus according to this invention. This apparatus includes spaced molding pans 11 together with follower members 12 slidably fitted therein and springs 13 for holding the stacked molds and follower members in telescoped relationship. Upstanding guide rods 14 connected to the molding pans 11 fit slidably in apertures 15 piercing plates 16 rigidly interconnecting the follower members as well as in ears 17 on the mold pans.

As shown both in Figures 1 and 2, the brim of the molding pans terminates in flanges 20. Horizontally aligned molds are rigidly interconnected by channel irons 21 affixed to the under sides of facing flanges 20 and subjacent mold walls. To each channel iron 21 one guide rod 14 is affixed by a bolt 22. Guide rods supported by the channel irons are thus common guide means for the two molds on either side thereof.

Angle irons 25 are affixed to the under sides of the flanges 20 and adjacent mold walls at the outside of the molds to hold other guide rods 14 by means of bolts 26.

Ears 17 of different molds affixed to the mold walls below the channel irons 21 are aligned vertically as between opposed molds and overlap horizontally. The overlapping portions coact to confine movement of the guide rods 14 encompassed thereby to the direction of stacking. The ears 17 affixed to the mold walls below the angle irons 25 prevent outward displacement of guiding rods encompassed thereby.

As shown in Figure 1, the follower members 12 are distinguished by a generally U-shaped cross-section, the shanks of the U being deflected inwardly. A relatively low broad U-shaped member 28 is inserted within the follower members, whose shanks also are deflected inwardly. All these deflected shank ends have flush upper surfaces affixed to the plate 16 by screws 29.

The outside ears below the angle irons 25 are provided with apertured outward lugs 31. The terminal parts of the plates 16 are pierced by apertures 32 aligned with the lug apertures and serving to hold the ends of the springs 13 spaced from the ears 17, the plate 16 and the angle irons 25.

The mold pans may be fabricated in rectangular form from stainless steel by stamping or otherwise so as to be devoid of seams and joints and present a smooth inner surface. Other members are also suitably composed of stainless steel or other corrosive resistant material.

In utilizing the apparatus for multiple processing and molding, meat products such as hams 50 are respectively fitted within the containers, and the follower members are fitted therein. The molds and followers being stacked, pressure is applied either by a press or by other means such as jacks, to telescope the follower members into the molds, and to compress the ham 50 from its original shape shown in Figure 1 in broken lines to the shape shown in full lines. Thereafter stressed springs are hooked over the top plates 16 and the lowermost lugs 31, to maintain the telescoped relationship. The compressed ham or other meat product is thus held under continued resilient pressure which allows breathing of meat as it is processed. The entire apparatus may then be placed in suitable boilers or other cooking devices for the further processing of the mold contents, during which time the springs act resiliently to retain the follower members in contact with the contents of the molds.

The invention is not confined to the above-described preferred form but includes many other embodiments. The mold pans need not be rectangular but may be curved; the means rigidly interconnecting the molds may comprise, for instance, a plate to which the bottoms of the molds are attached; if perforated, such a plate may also assume the function of the ears; the guide rods may be directed downwardly instead of upwardly; a plurality of rows of molds may be aligned horizontally, several such pluralities of rows being stacked alternately with similarly aligned groups of follower members; the follower members may be reinforced by bridging members in place of U-shaped members; the guide means may assume forms other than rods sliding through apertures and ears, for instance, that of longitudinally slotted tubes encompassing and slidable over T-rails. Since many details of construction may be varied widely without departing from the principles of this invention, it is not my intention to limit the patent granted on the invention otherwise than necessitated by the scope of the appended claims.

I claim as my invention:

1. In an apparatus for the processing and molding of meat products, a plurality of rows of molds, means rigidly interconnecting the molds within each row, a plurality of rows of follower members movable in said molds, means rigidly interconnecting the follower members within each row in vertical alignment with said molds, said groups of molds and follower members alternating in stacked aligned relationship, guide means associated with each row of molds for confining the movement of an immediately superposed row of follower members and the next superposed row of molds to the direction of alignment, and resilient pressure-generating means for urging the lowermost row of molds and the uppermost row of follower members toward each other.

2. In an apparatus for the processing and molding of meat products, a plurality of rows of molds, means rigidly interconnecting the molds within each row, a plurality of rows of follower members movable in said molds, means rigidly interconnecting the follower members within each row in vertical alignment with said molds, said rows of molds and follower members alternating in stacked aligned relationship, guide rods associated with said rows of molds, said rows of interconnected follower members being apertured to receive said rods in slidably fitting relationship, ears on said molds apertured to receive said rods in slidable guiding relationship, and resilient pressure-generating means for maintaining said molds and follower members in telescoped relationship.

3. Apparatus for the processing and molding of meat products comprising a plurality of rectangular molds disposed as a plurality of vertically spaced groups, the molds within each group being aligned horizontally in spaced relationship and aligned vertically with the molds of the other groups, members bridging the interspaces between horizontally aligned molds to interconnect the same rigidly, members projecting outwardly from the outside of the outermost molds in each group in alignment with said bridging members, an upstanding guide rod carried by each bridging member and each projecting member, ears attached to interconnected sides of horizontally aligned molds, said ears being aligned vertically and overlapping horizontally as between pairs of interconnected molds to encompass guide rods in sliding fit and confine motion thereof to the direction of vertical alignment, other ears attached to the outside of the outermost molds of each group to encompass other guide rods and prevent outward displacement thereof, a plurality of follower members of U-shaped cross section slidable within said molds, a like number of U-shaped reinforcing members affixed to the top of said follower members, the shanks of said follower members and reinforcing members terminating flush with each other, said follower members being aligned horizontally and vertically similarly to said molds for telescoping thereinto, terminally apertured plates rigidly interconnecting horizontally aligned follower members, said plates being perforated to receive said guide rods in sliding fit, apertured outward lugs on ears attached to the outside of the outermost molds, and springs having ends hooked into the terminal apertures of said follower members and into the apertured lugs, to maintain the assembled molds and follower members in telescoped relationship.

4. In an apparatus for processing and molding meat products including a plurality of groups of horizontally aligned molds and a plurality of groups of horizontally aligned follower members movable in said molds, the improvement comprising means rigidly interconnecting said groups of horizontally aligned molds, guide means associated with said interconnecting means, means rigidly interconnecting said group of horizontally aligned follower groups, said means interconnecting said follower members being adapted slidingly to receive said guide means, and members attached to said molds adapted slidingly to receive said guide means.

5. In an apparatus for processing and molding meat products including a plurality of groups of horizontally aligned molds and a plurality of horizontally aligned follower members movable in said molds, the improvement comprising means rigidly interconnecting said groups of molds, means rigidly interconnecting said groups of follower members, guide means common to each group of molds, and members attached to said groups of molds and follower members adapted to slidingly receive said guide means.

6. In an apparatus for processing and molding meat products including a plurality of groups of horizontally aligned molds and a plurality of horizontally aligned follower members movable in said molds, said groups alternating in stacked aligned relationship, means rigidly interconnecting horizontally aligned molds, means rigidly interconnecting horizontally aligned follower members, and other means interconnecting said rigidly interconnecting means to maintain horizontal and vertical alignment of said molds and said members while said apparatus is assembled.

7. In an apparatus for pressing and molding meat products including a plurality of groups of horizontally aligned molds and a plurality of horizontally aligned follower members movable in said molds, said groups alternating in stacked aligned relationship, and means for maintaining said horizontal alignment and said vertical alignment while said apparatus is assembled.

8. As an article of manufacture, a mold adapted for compacting several of a plurality of portions of a meat product when aligned with other like molds adapted for compacting others of said portions, the aligned relationship being maintained by guide members, said molds comprising a plurality of rigidly interconnected open top pans and members formed slidingly to receive said guide members, said pans having guide members connected therewith for sliding reception by adjacently aligned molds.

9. In an apparatus for the processing and molding of a meat product, a plurality of groups of rigidly interconnected molds, each mold being adapted to contain a portion of the product, said groups of molds being arranged in tandem relationship, a plurality of means distributed between said groups of molds for maintaining said aligned relationship from the initial moment of assemblage of said apparatus, and common pressure-generating means to compress the portions of meat product contained in said molds.

10. Tandem and horizontally aligned molding pans fixedly interconnected on juxtaposed sides by intermediate guide means constructed and arranged to cooperate slidingly with guide means on adjoining tandem pans when groups of said pans are superimposed in stacked assembled relation.

FRANK H. HOY.